United States Patent [19]

McNay

[11] Patent Number: 4,858,850
[45] Date of Patent: Aug. 22, 1989

[54] AIRCRAFT OPEN VIEWING PORT CONFIGURATION

[75] Inventor: Curtis E. McNay, Wichita, Kans.
[73] Assignee: The Boeing Company, Seattle, Wash.
[21] Appl. No.: 71,631
[22] Filed: Jul. 9, 1987
[51] Int. Cl.$^4$ .............................................. B64D 47/00
[52] U.S. Cl. ................................... 244/1 R; 244/130; 350/319; 350/584
[58] Field of Search ................ 244/1 R, 129.1, 129.3, 244/124.4, 130, 207, 200, 198, 208, 209, 204; 350/329, 584

[56] References Cited

U.S. PATENT DOCUMENTS

| | | |
|---|---|---|
| 2,049,573 | 8/1936 | Stalker . |
| 2,219,234 | 10/1940 | Messerschmitt .................... 244/209 |
| 2,841,182 | 7/1958 | Scala .................................... 244/209 |
| 2,894,703 | 7/1959 | Hazen ................................. 244/209 |
| 3,216,455 | 11/1965 | Cornell et al. ..................... 244/130 |
| 3,374,971 | 3/1968 | Heskestad ........................... 244/209 |
| 3,437,371 | 4/1969 | Gallie ................................. 244/130 |
| 3,934,846 | 1/1976 | Maurer . |
| 3,951,360 | 4/1976 | Anyonnaz ......................... 244/209 |
| 3,973,219 | 8/1976 | Kepler et al. ...................... 350/319 |
| 4,664,345 | 5/1987 | Lurz ................................... 244/130 |
| 4,703,904 | 11/1987 | Haslund ............................. 244/130 |

OTHER PUBLICATIONS

Boeing Doc. No. D-180-28729, "Free Shear Layer Aero-Optic Jitter", P. Cassady, Apr. 1985.
Boeing Doc. No. D-180-28220-1, "Angular Deflection of A light Ray Through a Free Shear Layer", P. Cassady, Apr. 1985.
Boeing Doc. No. D-180-28219-1, "Compressible Turbulent Shear Layer Growth Over Optical Ports", P. Cassady, Apr. 1985.

Primary Examiner—Galen L. Barefoot
Attorney, Agent, or Firm—Finnegan, Henderson, Farabow, Garrett & Dunner

[57] ABSTRACT

Apparatus for reducing drag and improving optical observation through an open aircraft port includes a ramp mounted on the port downstream edge, orifices or slots in the ramp surface interconnected by a manifold, and an associated air pump for withdrawing air from the free shear layer through the ramp to provide reattachment of the free shear layer at a preselected location on the ramp. The apparatus also can include conduits for supplying the extracted air to apertures located in a lip on the port upstream edge for injecting air along the free shear layer to control detachment.

12 Claims, 3 Drawing Sheets

AIRCRAFT OPEN VIEWING PORT CONFIGURATION

BACKGROUND OF THE INVENTION

1. Field of the Invention

The present invention relates to an apparatus for reducing drag and improving optical observation through an open aircraft port or cavity during flight.

2. Description of the Prior Art

The art has long recognized the problems of increased turbulence and drag caused by an open aircraft port during flight, such as an open bomb bay door. In U.S. Pat. No. 3,934,846 (Maurer) the patentee first describes prior attempts to reduce the instability effects of excessive pressure oscillations and turbulence resulting from air flow past an open cavity and then proceeds to describe an improved air flow deflector and diffuser assembly. The assembly described in Maurer comprises an aerodynamicallyshaped flap positioned at the rearward, downstream edge of the open port, and extending traversely to the airstream. The rear-mounted flap is further stated to be useful in conjunction with a similar flap device installed at the leading, upstream edge.

More recently, increased interest in reducing turbulence across open aircraft ports has stemmed from studies into the possible use of aircraft as high altitude platforms for infrared telescopes and other optical devices requiring a high degree of atmospheric cavity. The present inventor is aware of investigations and tests by Haslund relating to the use of apparatus for injecting air in the vicinity of the upstream edge of an open-port in an attempt to stabilize the free shear layer in the detached airstream. See Ser. No. 781,864 "Stabilized Aero-Optical Free Shear Layer Interface", filed Sept. 30, 1985, by R. L. Haslund.

Other tests have involved the use of a perforated fence-like device upstream of the open port to deflect and thicken the shear layer and provide a degree of turbulence homogenization within that layer. And finally, various studies have been performed relating to the two dimensional flow fields for different shapes and relative locations of the forward lip and aft ramp of the open port.

The present invention seeks to provide improved performance over these prior attempts to reduce turbulence in the free shear layer. Particularly in infrared astronomy applications, it becomes very important to develop and maintain a smooth free shear layer with minimum air density variations across and around the port.

SUMMARY OF THE INVENTION

In accordance with the present invention, as embodied and broadly described herein, the apparatus for reducing drag from, and improving optical observation through, an open aircraft port during flight, the open port having an upstream edge and a downstream edge relative to the airstream, the airstream detaching from the vicinity of the upstream edge and flowing across the open port in a free shear layer, comprises a ramp positioned at the downstream edge and having a ramp surface facing the port, and means associated with the ramp for inducing reattachment of the free shear layer at a preselected location on the ramp surface. By these instrumentalities, flow disturbances over and aft of the port are reduced, and density variations in the free shear layer across the port are reduced.

Preferably, the reattachment means includes means for extracting air from the vicinity of the predetermined ramp surface location, and the extracting means includes a plurality of openings in the ramp surface, and means connected to the openings for withdrawing air through the openings, the openings being located adjacent the predetermined ramp surface location.

It is also preferred that the air-withdrawing means includes a manifold formed within the ramp interconnecting the openings, and an air pump having an inlet connected to the manifold.

Further in accordance with the present invention, the intergrated apparatus for reducing drag from, and improving optical observation through, an open aircraft port during flight apparatus comprises a lip positioned at the port upstream edge and having a lip surface facing the port, and at least one aperture formed in the lip surface and oriented for injecting air through the lip surface adjacent the free shear layer in the direction of the airstream, for controlling the detachment of the free shear layer from the port upstream edge. The integrated apparatus further includes a ramp positioned at the port downstream edge and having a ramp surface facing the port with a preselected location for airstream reattachment. A plurality of openings are provided in the ramp surface for withdrawing air through the ramp surface to provide reattachment of the free shear layer on the ramp surface, the openings being distributed fore and aft of the preselected location. Still further, the integrated apparatus has means including an air pump connected to withdraw air through the openings and for supplying, at least in part, the air injected through the aperture in the lip, whereby flow disturbance over and aft of the port are reduced and the density variations in the free shear layer across the port are reduced.

Preferably, a manifold connecting the openings is formed in the ramp and is connected to the air pump inlet by a conduit, and another conduit connects the air pump exhaust to the aperture.

It is still further preferred that the integrated apparatus includes means for feeding air into the interior of the aircraft cavity to which the port forms an opening.

The accompanying drawings which are incorporated in and constitute a part of the specification illustrate preferred embodiments of the present invnetion and, together with the description, serve to explain the principles of the invention.

Reference will now be made in detail to the preferred embodiments of the invention, examples of which are illustrated in the accompanying drawing.

DESCRIPTION OF THE PREFERRED EMBODIMENT

Figure 1:
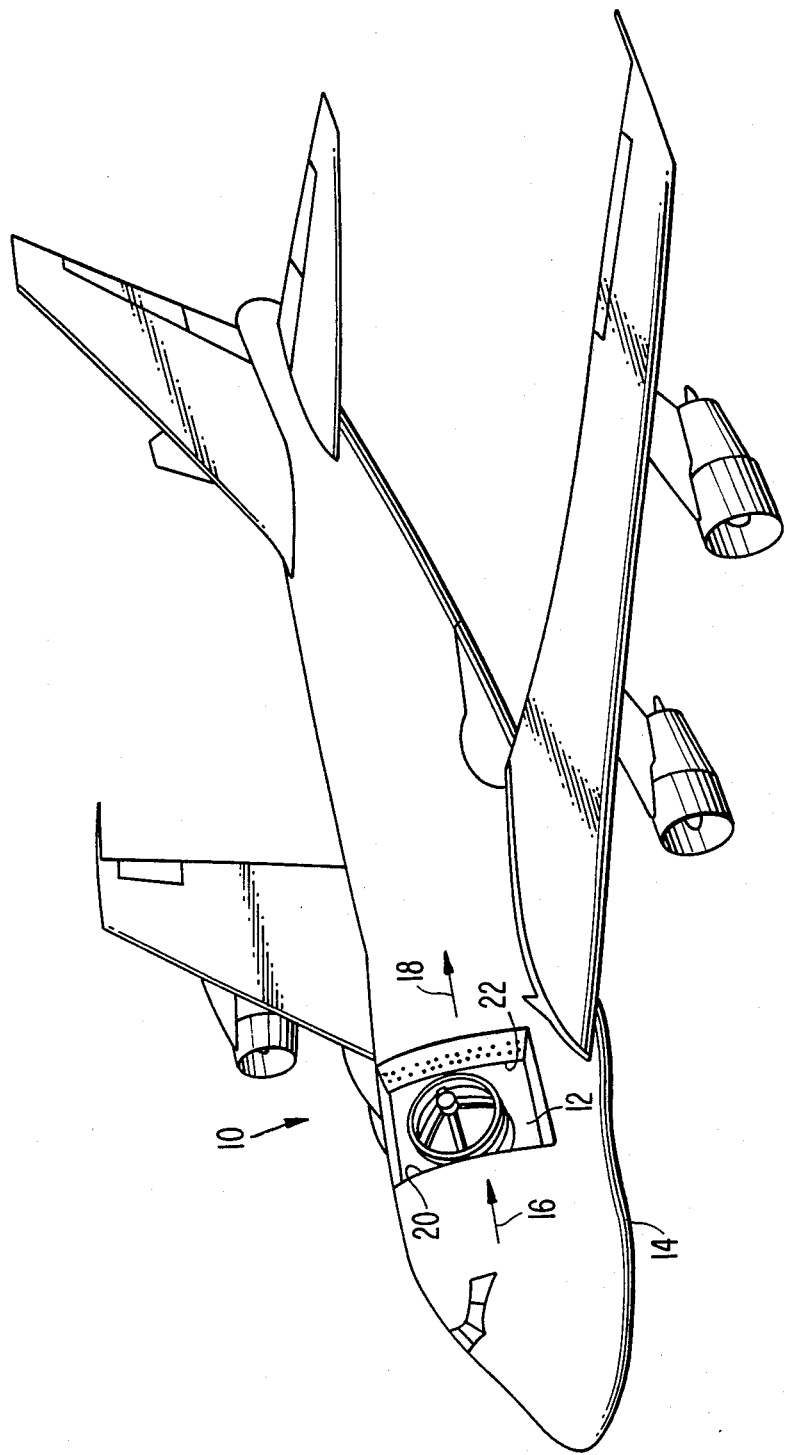
FIG. 1 is a schematic plan view of the present invention installed on an aircraft having an open, telescope viewing port.

Referring initially to FIG. 1, there is shown generally apparatus 10, made in accordance with the present invention, for reducing drag and improving optical observation through open port 12 in the fuselage of aircraft 14. In flight, the normal air-stream flow across port 12 is in the general direction indicated by arrows 16, 18 and, without the benefit of the present invention, would produce substantial turbulence over port 12 as a result of the airstream detaching from port upstream edge 20 and reattaching somewhere aft of port downstream edge 22. In fact, the position at which the detached airstream reattaches and stagnates may fluctuate and cause further pressure disturbances, temperature fluctuations, and thus density variations, in the free shear layer and adjacent flow over the aft ramp.

In accordance with the present invention, a ramp is positioned at the downstream edge of the port for providing a predetermined location for reattachment of the airstream. As embodied herein, and with reference to FIGS. 2 and 3, ramp 24 is provided at downstream edge 22 extending transversely across the width of port 12. The cross-sectional shape of ramp 24 is such as to provide a ramp surface 26 sloped to face open port 12 to serve as the reattachment surface for the airstream. Ramp 24 is configured to provide reattachment along line 28 (shown dotted) across surface 26 in the port width-wise direction (i.e., traverse locus of the airstream stagnation points). Although line 28 is shown straight for clarity, the exact shape of line 28 and of ramp 24 will vary depending upon the local airstream strength and direction. One skilled in the art given the present disclosure can determine the location of the desired airstream reattachment points along edge 22 and thus the variation in the shape of line 28.

Further in accordance with the invention, means associated with the ramp are provided for inducing the free shear layer to reattach at the preselected location on the ramp surface. As embodied herein, and with continued reference to FIGS. 2 and 3, the reattachment inducing means includes means generally designated by the numeral 30 for extracting air through ramp surface 26 from the vicinity of reattachment location line 28. Preferably, means 30 includes a plurality of openings 32 through ramp surface 26 and connected by manifold 34 which, in the illustrated embodiment, is formed in ramp 24 itself. Air pump 36 is connected to manifold 34 to draw a vacuum and thereby cause an airflow from the outside of ramp 24, through openings 32 and manifold 34, and out pump exhaust 38.

It is also preferred that openings 32 are distributed both fore and aft of the reattachment location line 28. Openings 32 can be circular orifices located on either side of line 28 in the stream-wise direction. Slots can be used for openings 32 in which case the slots should extend generally in the stream-wise direction and cross line 28. Other shapes are suitable for openings 32 as well as combinations of shapes. The effect of the shapes and positions of openings 32 should be to create a low pressure area along line 28 to induce reattachment of the free shear layer.

Figure 3:
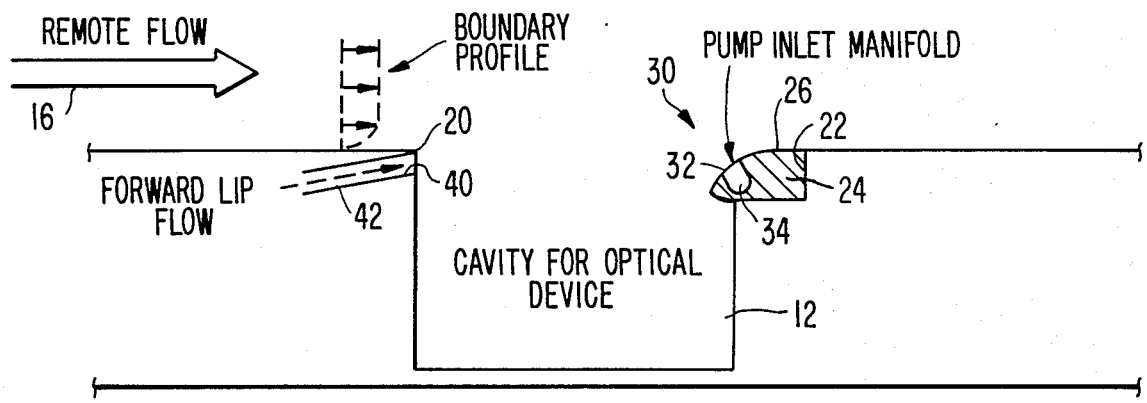
FIG. 3 is a schematic side view of the embodiment shown in FIG. 1 used in conjunction with forward lip blowing.

FIG. 3 shows that the present invention can be used to improve exisitng open port configurations which have been modified to have air injection proximate the port upstream edge. In the illustrated application port 12 includes lip 40 having one or more apertures 42 through which air can be injected into the free shear layer. Of course, the location of reattachment line 28 and/or the flow rate of the air extracted through openings 32 may have to be adjusted to compensate for the altered free shear layer, but one skilled in the art could readily accomplish this adjustment.

Figure 2:
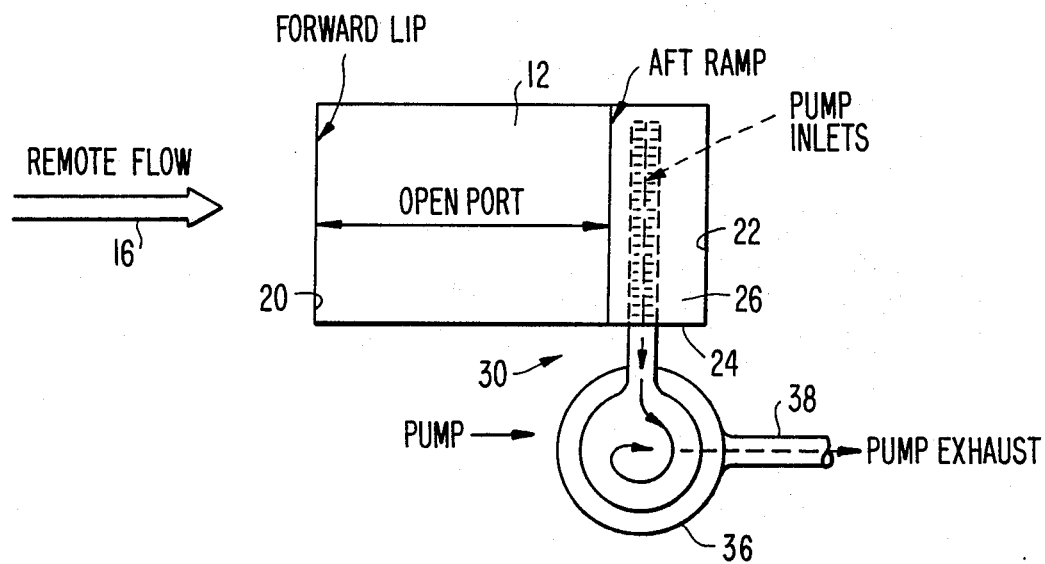
FIG. 2 is a schematic top view of the embodiment shown in FIG. 1.
Figure 4A:
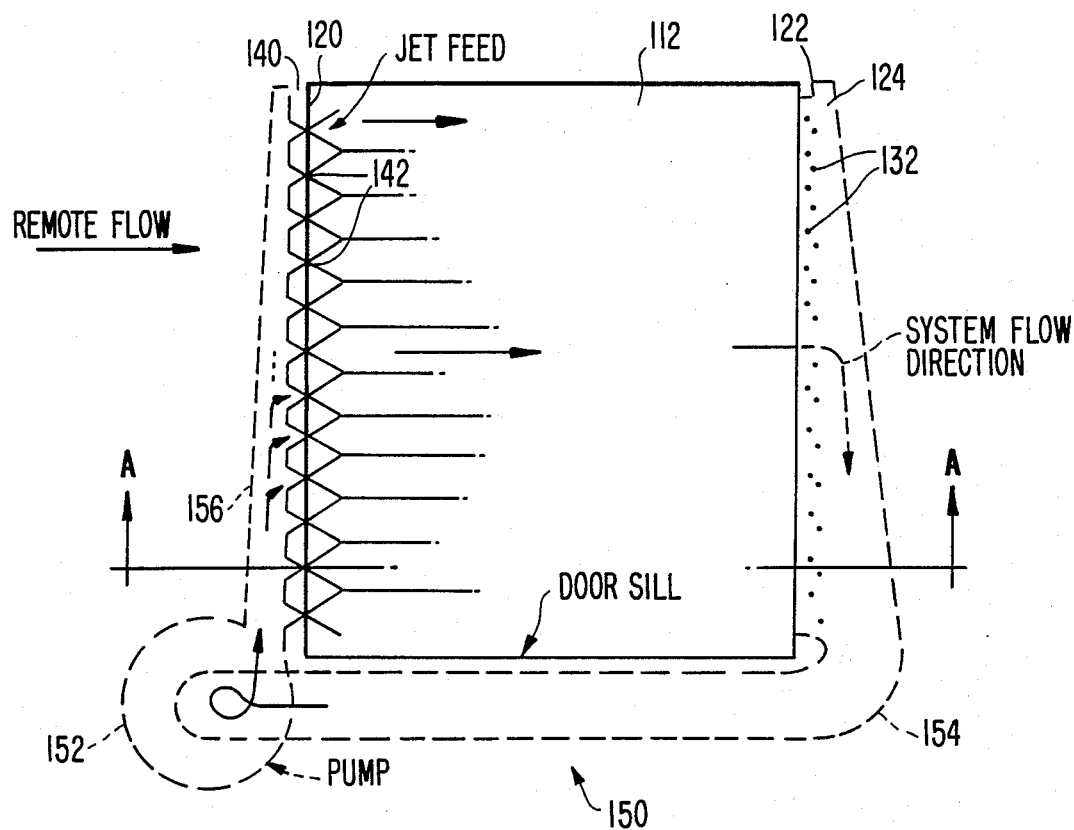
FIG. 4A is a schematic top view of a second embodiment of the present invention.

Although the air withdrawn through the ramp surface can simply be discharged to the atmosphere, such as depicted in FIGS. 2 and 3, some or all of the air can, in accordance with the present invention, be used to supply air injection means at the port upstream edge, to provide an integrated free shear layer control system. As embodied herein and with reference now to FIGS. 4A and 4B, there is shown port 112, having upstream edge 120 and downstream edge 122. Rammp 124 with air extraction openings 132 and internal collection manifold 134 is provided at port downstream edge 122 while lip 140 with air injection apertures 142 is positioned at port upstream edge 120. Air withdrawal and injection supply means designated generally by the numeral 150 includes air pump 152, conduit 154 connecting the air pump inlet to manifold 134, and conduit 156 connecting the air pump exhaust to each of apertures 142. Of course, apertures 142 alternatively can be interconnected by a manifold (not shown) in lip member 140 and the manifold connected to conduit 156. Also, conduits 154 and 156, as well as air pump 152, can be positioned according to existing space requirements. For example, if a door is arranged in port 112, the conduits 154 and 156 and the air pump 152 may be placed along the sills of the door.

Figure 4B:
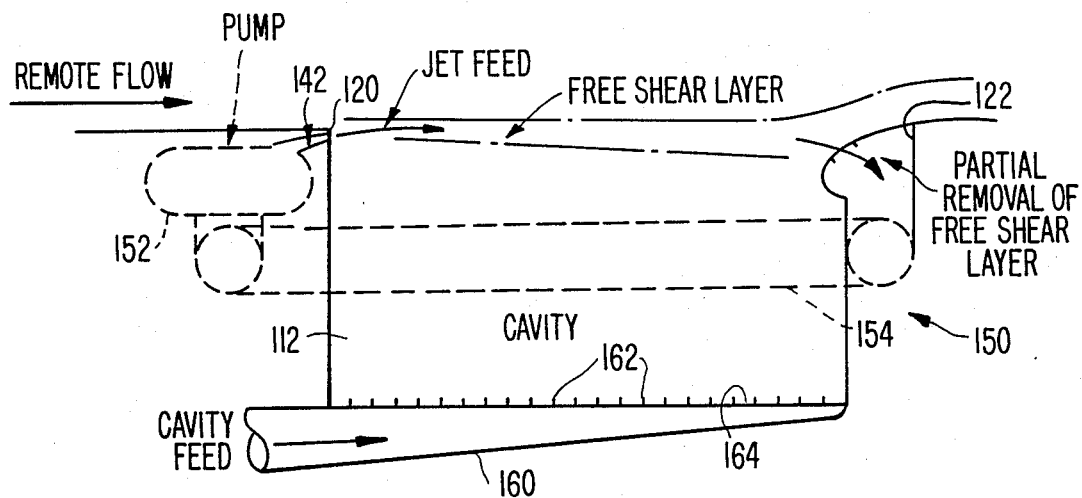
FIG. 4B is a schematic side view of the embodiment shown in FIG. 4A.

FIG. 4B also shows conduit 160 for carrying pressurized air to feed the cavity of port 112 such as through orifice 162 distributed in bottom wall 164. This cavity feed can help further stabilize the free shear layer by adjusting the relative pressure difference across the layer.

It will be apparent to those skilled in the art that various modifications and variations can be made in the aircraft open viewing port free shear layer stabilizing apparatus of the present invention without departing from the scope or spirit of the invention, and such modifications and variations are intended to be covered by the following claims.

What is claimed is:

1. Apparatus for reducing drag from, and improving optical observation through, an open aircraft port during flight, the open port having an upstream edge and a downstream edge relative to an airstream following past the port, the airstream detaching from the vicinity of the upstream edge and flowing across the open port in a free shear layer, the apparatus comprising:
   a ramp position at the downstream edge and having a ramp surface facing the port; and
   means associated with said ramp for inducing reattachment of the free shear layer at a preselected location on said ramp surface, wherein said reattachment means includes means for extracting air from the vicinity of said preselected ramp surface location, whereby flow disturbances over and aft of the port are reduced and density variations in the free shear layer across the port are reduced.

2. Apparatus for reducing drag from, and improving optical observation through, an open aircraft port during flight, the open port having an upstream edge and a downstream edge relative to an airstream following past the port, the airstream detaching from the vicinity of the upstream edge and flowing across the open port in a free shear layer, the apparatus comprising:
- a ramp positioned at the downstream edge and having a ramp surface facing the port; and
- means associated with said ramp for inducing reattachment of the free shear layer at preselected location on said ramp surface, wherein said reattachment means includes a plurality of openings in said ramp surface, and means connected to said openings for withdrawing air through said openings, said openings being located adjacent said preselected ramp surface location, whereby flow disturbances over and aft of the port are reduced and density variations in the free shear layer across the port are reduced.

3. The apparatus as in claim 2 wherein said openings are circular orifices distributed both fore and aft of said preselected ramp surface location.

4. The apparatus as in claim 2 wherein said openings are slots extending in the airstream direction across said preselected ramp surface location.

5. The apparatus as in claim 2 wherein said ramp extends substantially across the width of the port, and wherein said openings also are distributed across the width of the port.

6. The apparatus as in claim 2 wherein said air-withdrawing means includes a manifold formed within said ramp and interconnecting said openings, and an air pump having an inlet connected to said manifold.

7. In an open aircraft port of the type having an upstream edge and a downstream edge relative to an airstream flowing past the port, the airstream detaching from the vicinity of the upstream edge and flowing across the open port in a free shear layer, the port further having a lip positioned at the port upstream edge, a lip surface facing the port, and means associated with said lip for injecting air to control the free shear layer detaching from the port upstream edge, the improvement comprising:
- a ramp positioned at the downstream edge and having a ramp surface facing the port; and
- means associated with said ramp for inducing reattachment of the controlled free shear layer at a preselected location on said ramp surface wherein said reattachment means includes means for withdrawing air through said ramp surface at areas of said ramp surface surrounding said preselected ramp surface location, whereby flow disturbances over and aft the port are reduced and density variations in the free shear layer across the port are reduced.

8. The improvement as in claim 7 wherein said air withdrawing means includes at least one opening in said ramp surface and an air pump operatively connected to said opening.

9. In an open aircraft port of the type having an upstream edge and a downstream edge relative to an airstream flowing past the port, the airstream detaching from the vicinity of the upstream edge and flowing across the open port in a free shear layer, the port further having a lip positioned at the port upstream edge, a lip surface facing the port, and means associated with said lip for injecting air to control the free shear layer detaching from the port upstream edge, the improvement comprising:
- a ramp positioned at the downstream edge and having a ramp surface facing the port; and
- means associated with said ramp for inducing reattachment of the controlled free shear layer at a preselected location on said ramp surface.
- wherein said reattachment means includes means for extracting air from the vicinity of said predetermined ramp surface location, and the improvement further including means for supplying at least a portion of said air extracted to the air injection means for injection through the lip, whereby flow disturbances over and aft the port are reduced and density variations in the free shear layer across the port are reduced.

10. Apparatus for reducing drag from, and improving optical observation through, an open aircraft port during flight, the open port having an upstream edge and a downstream edge relative to the airstream, the airstream detaching from the vicinity of the upstream edge and flowing across the open port in a free shear layer, the apparatus comprising:
- a lip positioned at the port upstream edge and having a lip surface facing the port;
- at least one aperture formed in said lip surface and oriented for injecting air through said lip surface adjacent the free shear layer in the direction of the airstream for controlling the detachment of the free shear layer from the port upstream edge;
- a ramp positioned at the downstream edge and having a ramp surface the port with a preselected location for airstream reattachment;
- a plurality of openings in said ramp surface for withdrawing air through said ramp surface to provide reattachment of the free shear layer on said ramp surface, said openings being distributed fore and aft of said preselected location; and
- means including an air pump connected to withdraw air through said openings and for supplying at least in part, the air injected through said aperture in said lip, whereby flow disturbance over and aft of the port are reduced and the density variations in the free shear layer across the port are reduced.

11. The apparatus as in claim 10 wherein said means for withdrawing air and supplying injected air includes a manifold connecting said openings, first conduit means connecting said manifold to said air pump inlet, and second conduit means for connecting said air pump exhaust to said aperture.

12. The apparatus as in claim 10 wherein the port defines an opening to an aircraft cavity, the apparatus further including means for feeding air into the interior of said cavity.

* * * * *